United States Patent
Sievers et al.

(10) Patent No.: US 7,420,774 B2
(45) Date of Patent: Sep. 2, 2008

(54) HOUSING WITH A RAIL SHAPED TO REDUCE IMPACT DAMAGE

(75) Inventors: Ryan Andrew Sievers, Lyons, CO (US); Jason Allen Sorrell, Aurora, CO (US)

(73) Assignee: Seagate Technology LLC, Scotts Valley, CA (US)

(*) Notice: Subject to any disclaimer, the term of this patent is extended or adjusted under 35 U.S.C. 154(b) by 328 days.

(21) Appl. No.: 11/238,842

(22) Filed: Sep. 29, 2005

(65) Prior Publication Data

US 2007/0070596 A1 Mar. 29, 2007

(51) Int. Cl.
*G11B 33/08* (2006.01)
*G11B 33/14* (2006.01)
*H05K 7/00* (2006.01)
*G06F 1/16* (2006.01)

(52) U.S. Cl. ............ 360/97.02; 361/685; 720/651
(58) Field of Classification Search ............ 360/97.03, 360/97.02; 720/651; 361/683–686
See application file for complete search history.

(56) References Cited

U.S. PATENT DOCUMENTS

| | | | |
|---|---|---|---|
| 5,394,306 A | 2/1995 | Koenck et al. ............ 361/809 |
| 5,552,946 A | 9/1996 | Bicknese et al. ......... 360/97.01 |
| 5,703,734 A | 12/1997 | Berberich et al. ........ 360/97.02 |
| 5,717,575 A * | 2/1998 | Copeland et al. ............ 361/756 |
| 5,751,514 A | 5/1998 | Hyde et al. .............. 360/97.01 |
| 5,757,580 A | 5/1998 | Andress et al. ........... 360/97.02 |
| 5,760,998 A | 6/1998 | Berberich et al. ........ 360/97.02 |
| 5,965,249 A | 10/1999 | Sutton et al. ............. 428/304.4 |
| 5,982,580 A | 11/1999 | Woldemar et al. ....... 360/97.02 |
| 6,021,041 A | 2/2000 | Genix et al. ............... 361/685 |
| 6,022,224 A | 2/2000 | Peters ........................ 439/66 |
| 6,023,392 A | 2/2000 | Kim ........................ 360/97.01 |
| 6,052,255 A | 4/2000 | Kawabe et al. .......... 360/97.02 |
| 6,064,567 A | 5/2000 | Cheng ...................... 361/685 |
| 6,078,498 A | 6/2000 | Eckerd et al. ............. 361/685 |
| 6,252,768 B1 | 6/2001 | Lin ........................... 361/687 |
| 6,272,011 B1 | 8/2001 | Chen ........................ 361/685 |
| 6,275,353 B1 | 8/2001 | Briggs .................... 360/97.02 |
| 6,288,866 B1 | 9/2001 | Butler et al. ............ 360/97.01 |
| 6,392,982 B1 | 5/2002 | Kobayashi et al. ......... 369/263 |
| 6,417,985 B1 | 7/2002 | Noda ...................... 360/97.01 |
| 6,473,263 B2 | 10/2002 | Jang et al. ............... 360/97.01 |
| 6,473,270 B1 | 10/2002 | McDonald et al. ........ 360/265 |
| 6,487,039 B1 | 11/2002 | Bernett .................... 360/97.02 |
| 6,498,719 B1 | 12/2002 | Bridges .................... 361/680 |
| 6,543,738 B2 | 4/2003 | Smith ...................... 248/345.1 |
| 6,545,865 B2 | 4/2003 | Zamora et al. ............. 361/685 |
| 6,583,950 B2 | 6/2003 | Yoshida et al. .......... 360/97.02 |
| 6,597,533 B1 | 7/2003 | Tanishima ............... 360/99.06 |
| 6,822,858 B2 | 11/2004 | Allgeyer et al. ........... 361/685 |
| 7,012,805 B2 | 3/2006 | Shah et al. ................ 361/685 |
| 7,218,474 B2 * | 5/2007 | Janik et al. .............. 360/97.02 |
| 2001/0012175 A1 | 8/2001 | Williams et al. ......... 360/97.01 |
| 2002/0057522 A1 | 5/2002 | Bernett et al. ............ 360/97.01 |
| 2003/0011974 A1 | 1/2003 | Curlee et al. ............. 361/683 |
| 2005/0111134 A1 | 5/2005 | Byun et al. .............. 360/97.01 |

* cited by examiner

*Primary Examiner*—William J Klimowicz
(74) *Attorney, Agent, or Firm*—David C. Bohn

(57) ABSTRACT

A housing has a base that includes a baseplate and a rail. The rail projects outwardly to an impact rim along a bottom edge of the rail. The rail includes a flexible web that couples the impact rim to the baseplate. A projecting contact surface on the impact rim is laterally offset from at least one bending axis through the flexible web. An impact to the contact surface is offset from the bending axis by a moment arm.

18 Claims, 4 Drawing Sheets

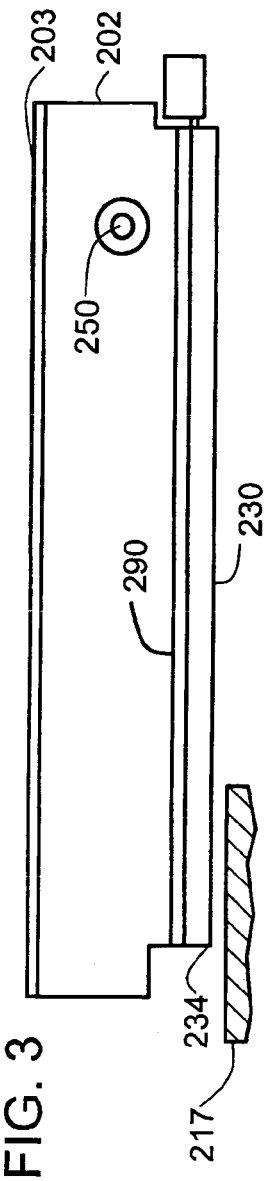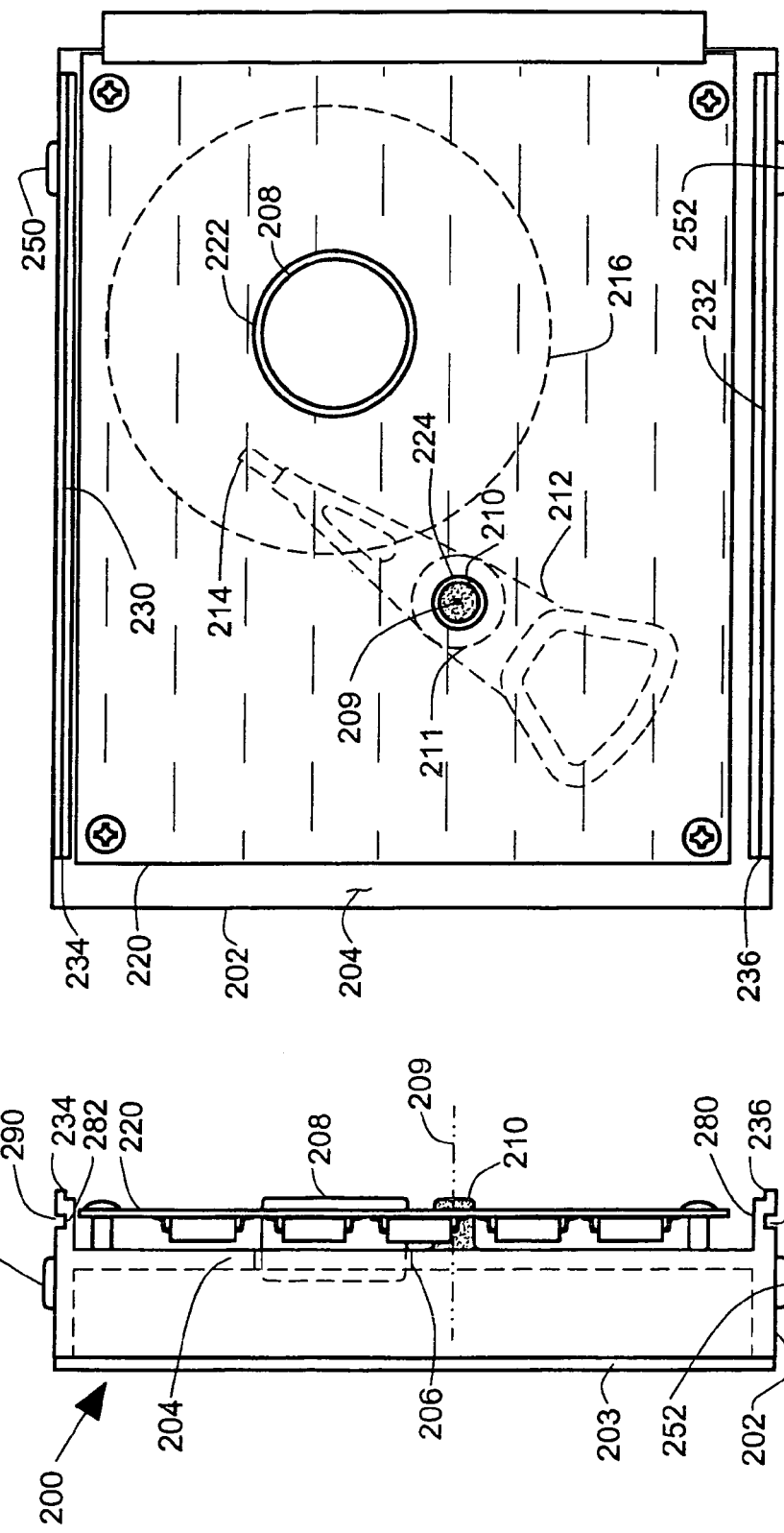

HOUSING WITH A RAIL SHAPED TO REDUCE IMPACT DAMAGE

FIELD OF THE INVENTION

The present invention relates generally to protecting delicate mechanical components from damage due to mechanical shock, and more particularly, but not by way of limitation, to protecting discs and heads in disc drives from shock damage.

BACKGROUND OF THE INVENTION

Disc drives include delicate mechanical components that can be damaged by shock if a disc drive is dropped on a hard surface or object during manufacturing, testing or installing the disc drive in a computer. In particular, disc drives include read/write heads that are mounted on delicate mechanical suspensions to access disc surfaces. When there is mechanical shock or vibration, the read/write heads can bounce on the disc surfaces. The bouncing can damage the disc surfaces, the read/write heads or both.

Many disc drives include side rails that protrude from a bottom side of a disc drive housing. It is found that damage to discs or heads from a head slap event is often traceable to shocks that occur when a rail impacts a hard surface. The head temporarily separates from the disc and then slaps back on the disc.

A method and apparatus are needed to reduce head slap or other damage to mechanical components in a housing with side rails when the side rails impact a hard surface. Embodiments of the present invention provide solutions to these and other problems, and offer other advantages over the prior art.

SUMMARY OF THE INVENTION

Disclosed is a housing comprising a base. The base includes a baseplate and a rail. The rail projects outwardly to an impact rim that extends along a bottom edge of the rail. The rail includes a flexible web that couples the impact rim to the baseplate.

A projecting contact surface on the impact rim is laterally offset from at least one bending axis through the flexible web. An impact to the contact surface is offset from the bending axis by a moment arm.

In one embodiment, the housing comprises a scanning mechanism supported on the base and susceptible to impact damage. The bending of the flexible web buffers the scanning mechanism from the impact. In another embodiment, the scanning mechanism comprises a read/write head and a storage disc.

Other features and benefits that characterize embodiments of the present invention will be apparent upon reading the following detailed description and review of the associated drawings.

BRIEF DESCRIPTION OF THE DRAWINGS

FIGS. 1-3 illustrate a disc drive housing with impact rims.

DETAILED DESCRIPTION OF ILLUSTRATIVE EMBODIMENTS

Figure 4:
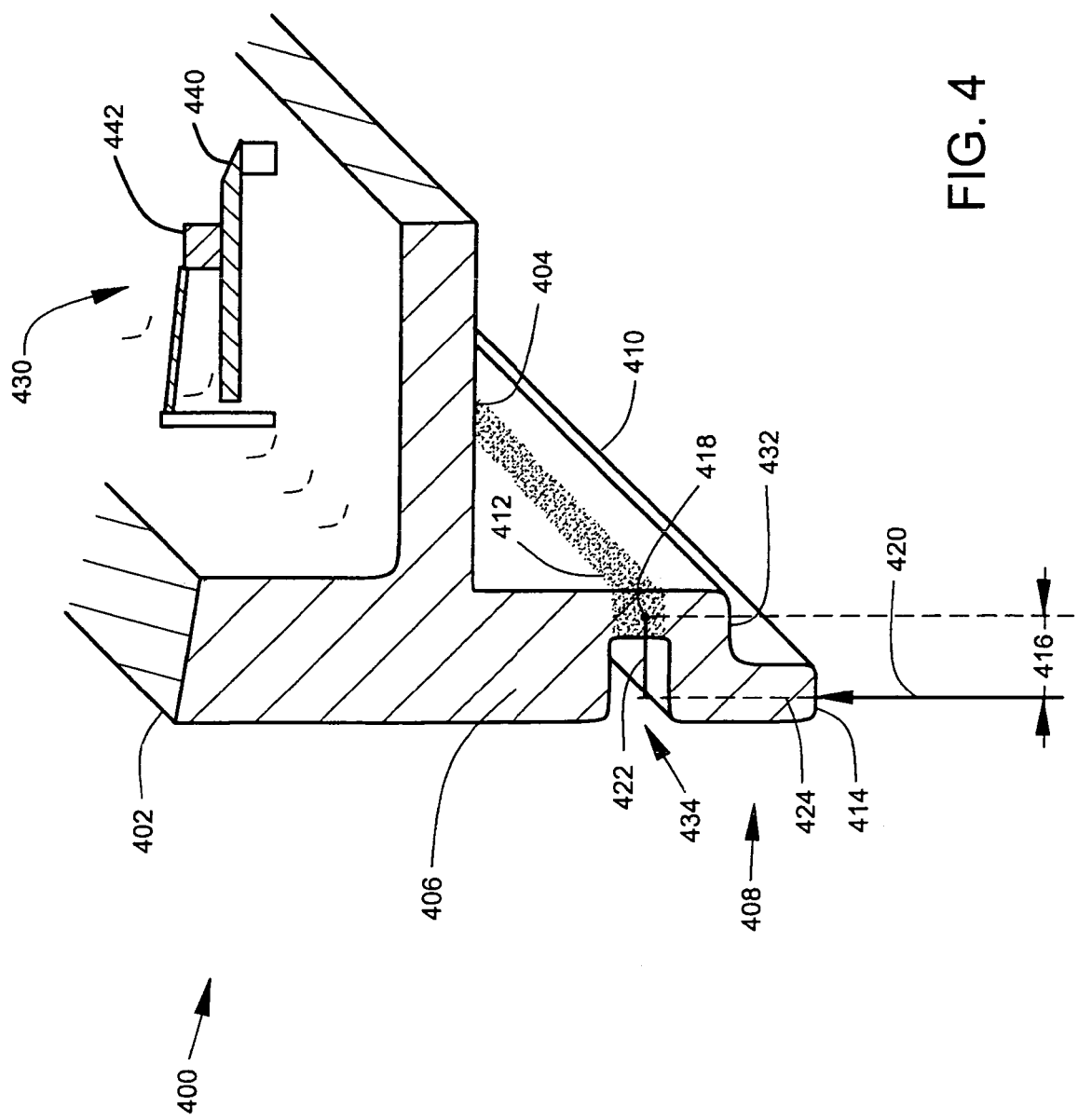
FIG. 4. illustrates a portion of a housing with an impact rim.

In the embodiments described below, bending of a flexible web in a outwardly projecting housing rail buffers a scanning mechanism in the housing from an impact. A projecting contact rim is laterally offset from a bending axis by a moment arm and converts a portion of the impact into bending motion. The impact to the scanning mechanism is reduced. A disc drive housing is provided with rails on opposite sides, and when the disc drive housing is dropped on either rail and strikes a surface, head slap damage is greatly reduced.

FIGS. 1-3 schematically illustrate a disc drive housing 200 that has rails 230, 232 that are shaped to mitigate mechanical damage from impact. FIG. 1 illustrates an end view of the disc drive housing 200. FIG. 2 illustrates a bottom view of the disc drive housing 200. FIG. 3 illustrates a side view of the disc drive housing 200.

The disc drive housing 200 includes a base 202 used for mounting various disc drive components, and a cover 203. The base 202 includes a baseplate 204 that is generally planar, but includes a through hole 206 for mounting a spindle motor 208. The baseplate 204 also includes a mounting pad 210 for mounting a hub 211 (FIG. 2) of a rotary moving voice coil actuator arm 212 (FIG. 2). The mounting pad 210 (which is illustrated in FIGS. 1-2 with a stippled surface) is a generally round cylindrical protrusion from the baseplate 204. The mounting pad 210 typically has a central bore along an axis 209 for receiving a pivot shaft (not illustrated) for the actuator arm 212. A read/write head 214 is suspended on an end of the actuator arm 212. The read/write head 214 is supported by a delicate mechanical suspension over a media surface of a disc 216 that is spun by the spindle motor 208. The read/write head 214 and the disc 216 are subject to head slap damage from shock when the disc drive housing 200 is dropped on a surface such as surface 217 or otherwise impacts another object at one of the rails 230, 232.

A printed circuit board (PCB) 220 is mounted on a bottom side of the disc drive housing 200. The spindle motor 208 projects through a round hole 222 in the printed circuit board 220. The mounting pad 210 projects through a round hole 224 in the printed circuit board 220.

In order to protect the printed circuit board (PCB) 220, the spindle motor 208 and the mounting pad 210 from direct impact with other objects, rails 230, 232 project outwardly (and preferably downwardly) from the baseplate 204 to form impact rims 234, 236 (FIGS. 1-2) that extend along the bottom edges of the rails 230, 232. The impact rims 234, 236 and rails 230, 232 are shaped as described below in connection with examples in FIGS. 4-9 to mitigate impact damage to the read/write head 214 and the disc 216. The rails 230, 232 include grooves 290, 292 which are cut into the rails 230, 232 to form flexible webs 280, 282. In a typical handling and installation setting, the disc drive housing 200 is secured, typically by screws at mounting holes 250, 252 to a computer assembly. However, prior to completely mounting and securing the disc drive housing 200, the disc drive housing 200 may be dropped or set on surfaces so that there is a substantial impact to one of the impact rims 234 or 236.

The impacts at the impact rims 234, 236 are transmitted to the flexible webs 280, 282. The flexible webs 280, 282 are arranged in a mechanical relationship with the impact rims 234, 236 such that impacts transmitted to the read/write head 214 and to the disc 216 are greatly attenuated, avoiding head slap damage to the read/write head 214 and the disc 216. The impact rims 234, 236 have projecting contact surfaces that are laterally offset from a bending axis (or bending axes) that run through the flexible web. A generally vertical impact to a contact surface is offset from the bending axis by a moment arm. The offsetting of the impact from the bending axis causes a portion of the impact to be converted from translational motion to bending motion. The bending motion is dissipated by the bending of the flexible web, and less impact reaches delicate components such as the read/write head 214 and the disc 216. Details of the mechanical and geometric arrangement of the flexible webs 280, 282 and the impact rims 234, 236 via one or more moment arms are described in more detail below in connection with enlarged views of rails in FIGS. 4-5.

FIG. 4 illustrates a portion of a housing 400. The housing 400 comprises a base 402 that includes a baseplate 404 and a rail 406. The rail 406 projects outwardly to an impact rim 408 that extends along a bottom edge 410 of the rail 406. The rail 406 includes a flexible web 412 (identified by a stippled appearance) that couples the impact rim 408 to the baseplate 404. A projecting contact surface 414 on the impact rim 408 is laterally offset by a distance 416 from a bending axis 418 that passes through the flexible web 412. A generally vertical impact 420 (illustrated as an arrow) to the contact surface 414 is offset from the bending axis 418 by a moment arm 422.

The bending axis 418 runs lengthwise along the entire length of the rail 406 or, alternatively, the rail 406 can be provided with one or more vertical slots (not illustrated) that divide the rail 406 into shorter rail sections. The term "moment arm" as used in this application refers to a perpendicular distance from a line along which an impact is applied to a bending axis. In the example shown in FIG. 4, there is a moment arm 422 that is perpendicular to a line 424 along which impact 420 is applied. The moment arm extends from the line 424 to the bending axis 418. The force of the impact 420 multiplied by the length of the moment arm 422 calculates a bending force (torsional moment) about the bending axis 418. The torsional moment tends to bend the flexible web 412, dissipating impact force so that the full impact force does not reach a scanning mechanism 430 that is mounted adjacent the baseplate 404. The flexible web 412 bends to absorb the generally vertical impact 420. The flexible web 412 is formed of material, such as aluminum or plastic resin, that acts as a spring and a damper. The flexible web 412 is preferably formed as a seamless part of the rail 406.

The impact rim 408 preferably has a recessed surface 432 that is shielded from impact by the projecting contact 414. The base 402 preferably comprises metal or plastic resin. The mechanical dimensions of the flexible web 412 are preferably selected such that deformations of the flexible web 412 due to impact forces are generally in a elastic range of the metal or plastic resin material used. The flexible web 412 preferably rebounds from deflections due to impacts, so that the impact absorption feature can be used repeatedly. The base 402 can be provided with an additional rail or rail similar to rail 406. The flexible web 412 is adjacent a notch 434 that extends along a length of the rail 406.

The scanning mechanism 430 is supported on the base 402 and is susceptible to impact damage. The bending of the flexible web 412 buffers the scanning mechanism 430 from the generally vertical impact 420. The scanning mechanism 430 comprises data storage media 440 and a transducer 442 suspended adjacent the data storage media 440. The transducer 442 can comprise a magnetic head, an optical head, a magneto-optical head or a ferroelectric contact probe array. The transducer 442 may be in physical contact with the storage media 440 or suspended a small distance above the storage media 440. The transducer 442 can be a magnetic head that is either parked or flying. The transducer 442 can be a ferroelectric contact probe array that contacts ferroelectric storage media, or it can be a contact probe array that is retracted from the ferroelectric storage media. There is a potential for mechanical damage in each of these conditions.

Figure 5:
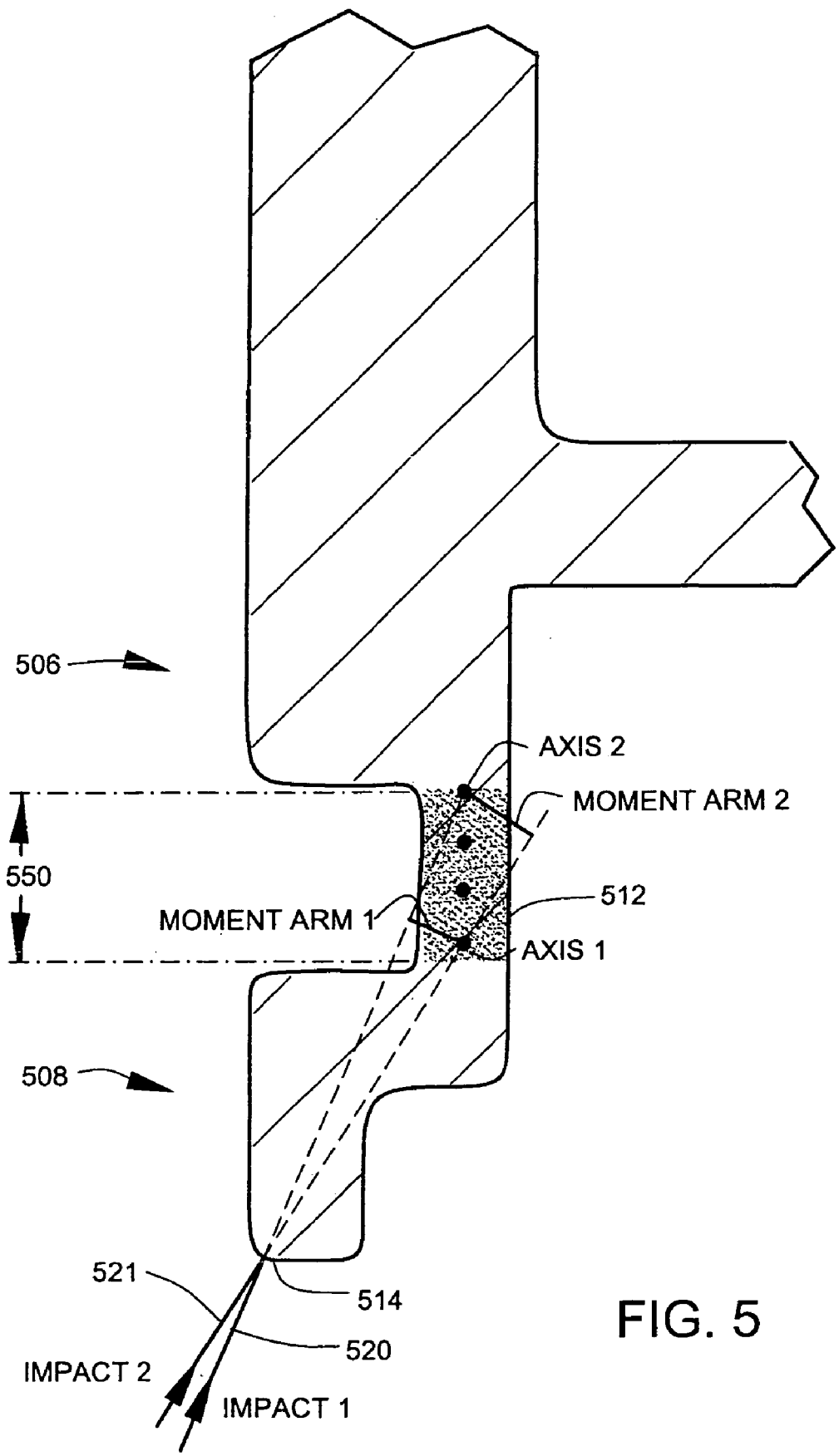
FIG. 5. illustrates an enlarged view of an impact rim.

FIG. 5 illustrates an enlarged view of a rail 506 that includes an impact rim 508 comparable to those shown in FIG. 4. The impact rim 508 has a contact surface 514 that can receive impacts 520, 521 from different angles that deviate from a vertical direction. A flexible web 512 (identified by a stippled appearance) extends along a vertical distance 550 of the rail 506. Bending of the rail 506 can take place at a number of bending axes along the length of the flexible web 512, including AXIS 1 and AXIS 2.

IMPACT 1 at 520 is aligned with AXIS 2, and thus IMPACT 1 has a zero moment arm relative to AXIS 2 and can't generate significant bending about AXIS 2. IMPACT 1, however, is not aligned with AXIS 1 and thus has a non-zero moment arm (MOMENT ARM 1) relative to AXIS 1. IMPACT 1 can thus generate significant bending about AXIS 1.

IMPACT 2 at 521 is aligned with AXIS 1, and thus IMPACT 2 has a zero moment arm relative to AXIS 1 and can't generate significant bending about AXIS 1. IMPACT 2, however, is not aligned with AXIS 2 and thus has a non-zero moment arm (MOMENT ARM 2) relative to AXIS 2. IMPACT 2 can thus generate significant bending about AXIS 2.

It can thus be seen that the flexible web 512 extends along a vertical axis range 550 to provide multiple bending axes that accommodate an angular range of non-vertical impacts. The impact to the contact surface 514 can come from any generally vertical angle and have a non-zero moment arm relative to at least one bending axis so that bending always takes place at some bending axis. The arrangement is thus not sensitive to impact angle. The projecting contact on a pair of rails can be arranged to provide an impact shielding angle of more than 180 degrees to protect a circuit card and other components between the rails.

Figure 6:
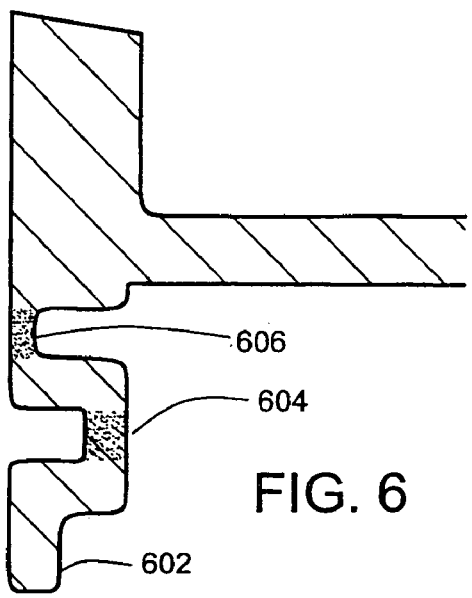
FIGS. 6-9 illustrate alternative embodiments of impact rims.

FIGS. 6-9 illustrate alternative embodiments of impact rims. FIG. 6 illustrates an embodiment with an impact rim 602 and a flexible web 604 as describe above in connection with FIG. 4 combined with a second flexible web 606. The second flexible web 606 provides some additional buffering of generally lateral impacts to the side of the impact rim 602.

Figure 7:
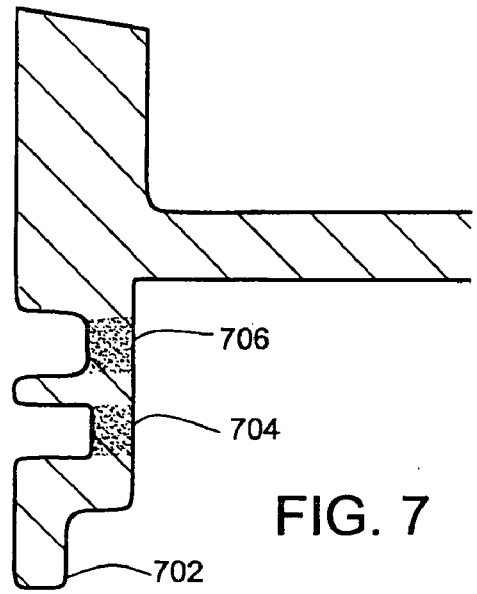

FIG. 7 illustrates an embodiment with an impact rim 702, a flexible web 704 as described above in connection with FIG. 4 combined with a second flexible web 706 that provide a wider vertical range of bending axis locations and increased bendability without exceeding an elastic limit of the materials.

Figure 8:
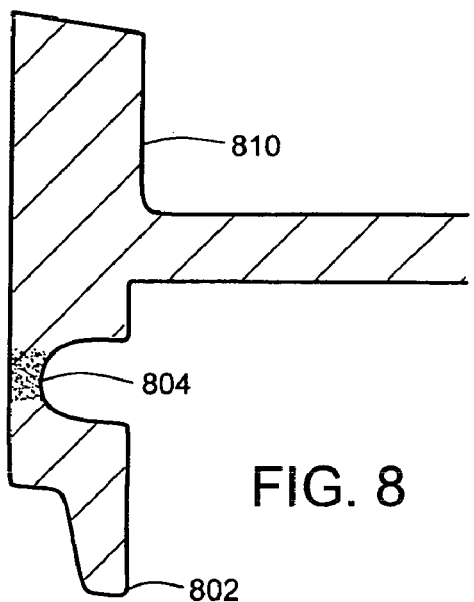

FIG. 8 illustrates an embodiment with an impact rim 802, and a flexible web 804. In the embodiment in FIG. 8, the impact rim 802 is on an inner side of a rail 810, and the flexible web 804 is on an outer side of the rail 810. The impact rim 802 and the flexible web 804 are on opposite sides of the rail 810, and non-zero moment arms are provided over a wide range axes and of angles as described above in connection with FIG. 5.

Figure 9:
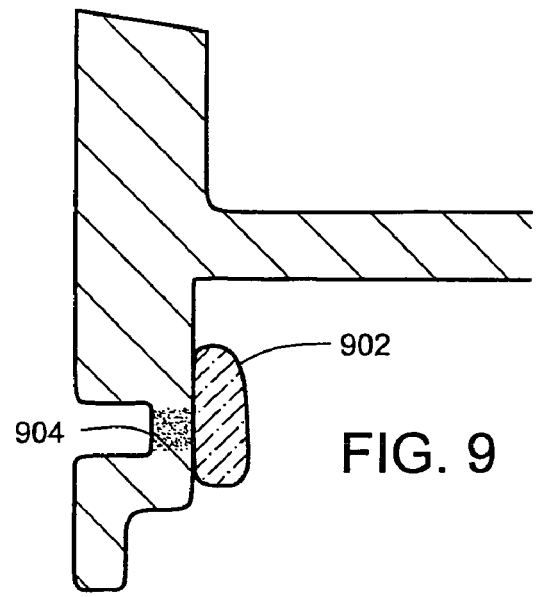

FIG. 9 illustrates an embodiment in which a bead of mechanical damping material, such as silicone rubber, is applied adjacent a flexible web 904 to provide mechanical damping of bending, providing further attenuation of impacts.

Features illustrated in one embodiment can be appropriately combined with features shown in another embodiment to meet the needs of a particular application.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the assembly while maintaining substantially the same functionality without departing from the scope of the present invention. In addition, although the preferred embodiment described herein is directed to a disc drive system for data storage, it will be appreciated by those skilled in the art that the teachings of the present invention can be applied to other assemblies of micromechanical components, without departing from the scope of the present invention.

What is claimed is:

1. A housing comprising:
    a base including a baseplate and a rail, the rail projecting along an outward direction to an impact rim that extends along an outer edge of the rail; the rail including a flexible web that couples the impact rim to the baseplate;
    a first projecting contact surface on the impact rim that is laterally offset from at least one bending axis through the flexible web such that an impact to the first contact surface is offset from the bending axis by a moment arm; and
    wherein the impact rim comprises a recessed surface that is not offset from the bending axis by a moment arm, the recessed surface being recessed relative to the first projecting contact surface along the outward direction to shield the recessed surface from impacts that are not offset by a moment arm.

2. The housing of claim 1 wherein the flexible web bends to absorb the impact.

3. The housing of claim 2 wherein the housing further comprises a scanning mechanism supported on the base and susceptible to impact damage, and the bending of the flexible web buffers the scanning mechanism from the impact.

4. The housing of claim 3 wherein the scanning mechanism comprises data storage media and a transducer suspended adjacent the data storage media, the transducer being selected from the group of: magnetic heads, optical heads, magneto-optical heads and ferroelectric contact probe arrays.

5. The housing of claim 1 wherein the flexible web extends along an axis range to provide multiple bending axes that accommodate an angular range of impacts.

6. The housing of claim 1 wherein the flexible web is adjacent a notch that extends along a length of the rail.

7. The housing of claim 1 and further comprising:
    a second rail that projects from the base to a second impact rim; and
    a second flexible web that couples the second impact rim to the base; and
    a projecting second contact surface on the second impact rim that is laterally offset from at least one second bending axis through the second flexible web such that an impact to the second contact surface is offset from the second bending axis by a second moment arm.

8. The housing of claim 7 wherein the first projecting contact surface and the second projecting contact surface provide an impact shielding angle of more than 135 degrees.

9. A method of reducing impact damage to a scanning mechanism, the method comprising:
    mounting the scanning mechanism to a base that has a baseplate and a rail that projects along an outward direction to an impact rim along a bottom edge of the rail;
    coupling the impact rim to the base side through a flexible web that extends along the rail, the flexible web including a bending axis;
    laterally offsetting a projecting contact surface on the impact rim from the flexible web such that an impact to the projecting contact surface is offset from the bending axis by a moment arm, and
    recessing a recessed surface of the impact rim that is not offset from the bending axis by a moment arm, the recessing being relative to the projecting contact surface along the outward direction to shield the recessed surface from impacts that are not offset by a moment arm.

10. The method of claim 9 and further comprising:
    forming the flexible web of a material that is bendable in an elastic deflection range to accommodate bending of the flexible web in response to the impact.

11. The method of claim 10 and further comprising:
    buffering the scanning mechanism from impact damage by bending the flexible web to absorb the impact.

12. A data storage device, comprising:
    a base having side rails that project along an outward direction to impact rims that extend along bottom edges of the side rails;
    a read/write mechanism mounted to the base;
    grooved sections extending along the rails, the grooved section providing a torsional coupling between the impact rims to the base; and
    the impact rims having projecting contact surfaces that are laterally offset from the grooved sections such that an impact to one of the impact rims has a moment arm relative to a bending axis through one of the grooved section; and
    wherein the impact rims comprise recessed surfaces that are not offset from the bending axes by moment arms, the recessed surfaces being recessed relative to the projecting contact surfaces along the outward direction to shield the recessed surfaces from impacts that are not offset by a moment arm.

13. The data storage device of claim 12 wherein the torsional coupling reduces an impact received at the read/write mechanism.

14. The data storage device of claim 12 wherein the read/write mechanism comprises a storage disc and a movable read/write head suspended adjacent the storage disc.

15. The data storage device of claim 14 wherein the movable read/write head has a park position, and the torsional coupling reduces head slap due to an impact with the read/write head in the park position.

16. The data storage device of claim 14 wherein the read/write head comprises a slider with an air bearing surface adjacent a storage media layer on the storage disc.

17. The data storage device of claim 16 wherein the storage media layer comprises magnetic storage media.

18. The data storage device of claim 12 wherein the read/write mechanism comprises a ferroelectric memory array and a probe contact array suspended adjacent the ferroelectric memory array.

* * * * *